(12) United States Patent
Okumura et al.

(10) Patent No.: US 9,445,444 B2
(45) Date of Patent: Sep. 13, 2016

(54) WIRELESS COMMUNICATION APPARATUS, NON-TRANSITORY COMPUTER-READABLE MEDIUM, WIRELESS COMMUNICATION METHOD, PERIPHERAL APPARATUS, AND CENTRAL APPARATUS

(71) Applicant: CASIO COMPUTER CO., LTD., Shibuya-ku, Tokyo (JP)

(72) Inventors: Ryo Okumura, Fussa (JP); Takahiro Tomida, Hamura (JP); Tsutomu Terazaki, Saitama (JP); Toshihiro Takahashi, Kunitashi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/657,773

(22) Filed: Mar. 13, 2015

(65) Prior Publication Data
US 2015/0264727 A1    Sep. 17, 2015

(30) Foreign Application Priority Data

Mar. 14, 2014   (JP) .................................. 2014-051547

(51) Int. Cl.
*H04B 7/00* (2006.01)
*H04W 76/02* (2009.01)
*H04W 4/00* (2009.01)
*H04B 1/68* (2006.01)

(52) U.S. Cl.
CPC ........... *H04W 76/021* (2013.01); *H04W 4/008* (2013.01)

(58) Field of Classification Search
CPC .. H04W 12/00; H04W 84/18; H04M 1/7253
USPC ................................ 455/41.2–41.3, 410–411
See application file for complete search history.

(56) References Cited

U.S. PATENT DOCUMENTS

2015/0172902 A1*  6/2015  Kasslin ................. H04L 45/745
                                                                    370/328

FOREIGN PATENT DOCUMENTS

JP         2012142877 A      7/2012

* cited by examiner

*Primary Examiner* — Lee Nguyen
(74) *Attorney, Agent, or Firm* — Holtz, Holtz & Volek PC (57) ABSTRACT

The accuracy of a connection is improved by avoiding unnecessary communication. A peripheral obtains an address from a central and saves the address. The peripheral transmits an advertisement including an address of a central which is a connection target. The central stores a history of its own addresses. The central receives the advertisement transmitted from the peripheral. The central determines whether the received advertisement includes any address in the history. If the central determines that the advertisement includes any address in the history, the central transmits to the peripheral a connection request signal for making a connection request.

10 Claims, 9 Drawing Sheets

WIRELESS COMMUNICATION APPARATUS, NON-TRANSITORY COMPUTER-READABLE MEDIUM, WIRELESS COMMUNICATION METHOD, PERIPHERAL APPARATUS, AND CENTRAL APPARATUS

BACKGROUND

1. Technical Field

The present invention relates to a wireless communication apparatus, a non-transitory computer-readable medium, a wireless communication method, a peripheral apparatus, and a central apparatus.

2. Related Art

The diffusion of Bluetooth (registered trademark) low energy (hereinafter, referred to as BLE) which is a short-range wireless communication standard with suppressed power consumption has progressed in recent years.

Wireless communication based on this BLE is performed between a peripheral which is a wireless communication device providing a service and a central which is a wireless communication device using the service.

Specifically, first, the peripheral intermittently transmits notice information called an advertisement for notifying of a summary of its service or its existence. Then, when the central receives the advertisement, the central transmits a connection request signal to the peripheral. Then, when the peripheral receives the connection request signal, the peripheral transmits data related to the service to the central (e.g., JP 2012-142877 A).

SUMMARY

Meanwhile, the peripheral can transmit a direct advertisement where identification information (e.g., an address) of a central which is a connection target is included in an advertisement. By this, the peripheral can perform transmission and reception of data with a specific central.

However, centrals include a terminal with a random address whose identification information changes periodically (e.g., an iPhone). Since this central with a random address does not have fixed identification information, even if the peripheral transmits a direct advertisement, the peripheral may not be able to establish a connection with the central. Hence, unnecessary communication occurs between the peripheral and the central.

Due to such a reason, there is a demand for a wireless communication technique that improves the accuracy of a connection by avoiding unnecessary communication between a peripheral and a central.

The present invention is made in view of such circumstances and an object of the present invention is therefore to provide a wireless communication apparatus, etc., capable of improving the accuracy of a connection by avoiding unnecessary communication.

There is provided a wireless communication apparatus including: a communicating unit configured to obtain, from another wireless communication apparatus, identification information of the another wireless communication apparatus, the identification information having been changed after a connection; a storage unit configured to store the identification information of the another wireless communication apparatus obtained by the communicating unit and having been changed after the connection; and a control unit configured to: determine whether the storage unit has identification information of another wireless communication apparatus being a connection target; and transmit notice information including the identification information of the another wireless communication apparatus being the connection target when the storage unit has the identification information of the another wireless communication apparatus being the connection target.

According to the present invention, the accuracy of a connection can be improved by avoiding unnecessary communication.

DETAILED DESCRIPTION

An embodiment of the present invention will be described below with reference to the drawings.

Figure 1:
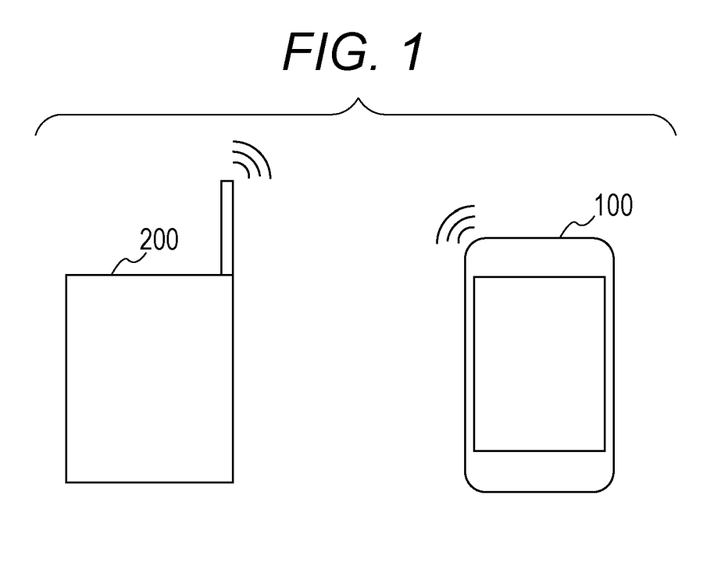
FIG. 1 is a diagram illustrating an exemplary configuration of a wireless communication system according to an embodiment.

FIG. 1 is a diagram illustrating an exemplary configuration of a wireless communication system according to an embodiment of the present invention.

In the exemplary configuration illustrated in FIG. 1, a wireless communication system 1 includes a peripheral 200 which is a wireless communication apparatus; and a central 100 which is a wireless communication apparatus different than the peripheral 200. Note that, for easy understanding, a description is made of an example case in which there are one peripheral 200 and one central 100. The case in which there are a plurality of peripherals 200 and a plurality of centrals 100 will be described later as a variant.

The peripheral 200 and the central 100 perform wireless communication with each other based on BLE. BLE is a standard (mode) designed for the purpose of low power consumption in a short-range wireless communication standard called Bluetooth.

Here, the central 100 uses a service (e.g., measured data) provided by the peripheral 200. The peripheral 200, on the other hand, provides the central 100 with the service.

In the present embodiment, the peripheral 200 provides measured, predetermined data as a service. Specifically, the peripheral 200 is placed in a location where a temperature and a humidity need to be measured, e.g., a factory, a construction site, a gymnasium, or a playground.

The central 100, on the other hand, is a portable terminal with a wireless communication function based on BLE, such as a mobile phone, a smartphone, a tablet personal computer, or a notebook personal computer. In the present embodiment, as an example, the central 100 is composed of a smartphone.

Figure 2:
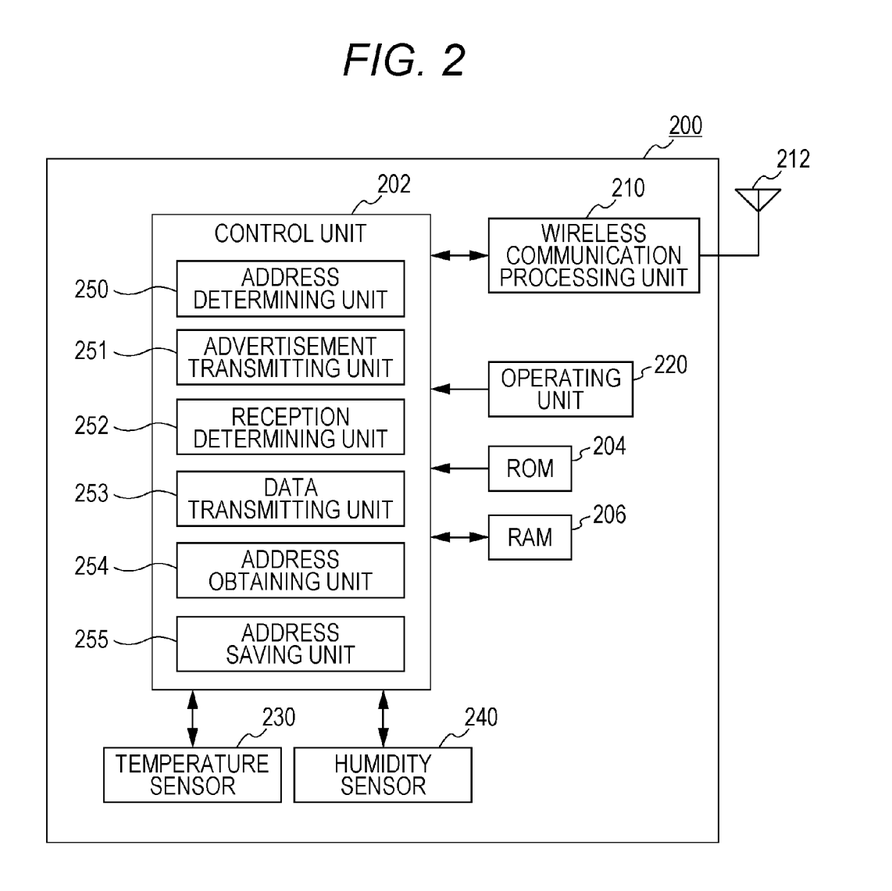
FIG. 2 is a block diagram illustrating an exemplary configuration of a peripheral according to the embodiment.

FIG. 2 is a block diagram illustrating an exemplary configuration of the peripheral 200 according to the embodiment. As illustrated in FIG. 2, the peripheral 200 includes a control unit 202, a ROM (Read Only Memory) 204, a RAM (Random Access Memory) 206, a wireless communication processing unit 210, an antenna 212, an operating unit 220, a temperature sensor 230, and a humidity sensor 240.

The control unit 202 is composed of, for example, a CPU (Central Processing Unit). The control unit 202 controls various types of functions provided to the peripheral 200, by performing a software process according to a program (e.g., a program for implementing, for example, an advertisement transmission process which will be described later) stored in the ROM 204.

The ROM 204 is composed of a nonvolatile memory such as a flash memory and stores, as described above, the program for controlling various types of functions by the control unit 202 and data. For the data, for example, data on a BD (Bluetooth Device) address which is identification information of the central 100 is stored. Note that the ROM 204 corresponds to a storage unit. Note also that the BD address is hereinafter simply called an address.

The RAM 206 is composed of a volatile memory and used as a work area for temporarily storing data in order for the control unit 202 to perform various types of processes.

The wireless communication processing unit 210 is composed using, for example, a radio frequency (RF) circuit and a baseband (BB) circuit. The wireless communication processing unit 210 performs transmission and reception of radio signals based on BLE through the antenna 212.

The operating unit 220 is composed of, for example, a switch and used to input user's operation instructions such as power ON and OFF.

The temperature sensor 230 is composed using, for example, a resistance bulb or a thermocouple. The temperature sensor 230 measures an ambient temperature of the peripheral 200, i.e., a temperature of the location where the peripheral 200 is placed, and sends data indicating the measurement result to the control unit 202.

The humidity sensor 240 is composed using, for example, a polymer film. The humidity sensor 240 measures an ambient humidity of the peripheral 200, i.e., a humidity of the location where the peripheral 200 is placed, and sends data indicating the measurement result to the control unit 202.

Next, a functional configuration of the control unit 202 of the peripheral 200 will be described. As illustrated in FIG. 2, the control unit 202 functions as an address determining unit 250, an advertisement transmitting unit 251, a reception determining unit 252, a data transmitting unit 253, an address obtaining unit 254, and an address saving unit 255.

The address determining unit 250 determines whether the ROM 204 has an address of the central 100 which is a connection target. Note that the address determining unit 250 corresponds to a determining unit.

If the address determining unit 250 determines that the ROM 204 has an address of the central 100 which is a connection target, the advertisement transmitting unit 251 broadcasts an advertisement including the address of the central 100. Note that the advertisement including the address of the central 100 which is a connection target is called a direct advertisement.

On the other hand, if the address determining unit 250 determines that the ROM 204 does not have an address of the central 100 which is a connection target, the advertisement transmitting unit 251 broadcasts an advertisement not including the address of the central 100. Note that the advertisement not including the address of the central 100 which is a connection target is called an undirect advertisement.

In the following, a description is made such that when there is no need to particularly distinguish between a direct advertisement and an undirect advertisement, they are collectively referred to as advertisements. The advertisement transmitting unit 251 corresponds to a notice information transmitting unit.

After transmitting the direct advertisement or the undirect advertisement, the reception determining unit 252 determines whether a connection request signal from the central 100 which is a connection target has been received. Note that the reception determining unit 252 corresponds to a reception determining unit.

After establishing a connection with the central 100 from which the connection request signal has been received, the data transmitting unit 253 transmits predetermined data to the central 100. In this embodiment, as an example, the data is measured data such as a temperature or a humidity measured by the temperature sensor 230 or the humidity sensor 240.

The address obtaining unit 254 obtains, from the central 100 with which the connection has been established, an address of the central 100 before disconnecting the connection. Note that the address obtaining unit 254 corresponds to an obtaining unit.

The address saving unit 255 saves the address obtained by the address obtaining unit 254 in the ROM 204. Note that the address saving unit 255 corresponds to a saving unit.

As described above, when the peripheral 200 establishes a connection with the central 100 in response to a connection request signal from the central 100, the peripheral 200 transmits data. Then, the peripheral 200 obtains and saves an address of the central 100 before disconnecting the connection with the central 100. By this, an address of the central 100 that has been connected once is stored in the ROM 204 while an address of the central 100 that has not been connected is not stored in the ROM 204. Hence, except for the case in which the central 100 which is a connection target is the central 100 that has not been connected, the advertisement transmitting unit 251 transmits a direct advertisement including an address of the central 100 which is obtained upon the past connection.

Figure 3:
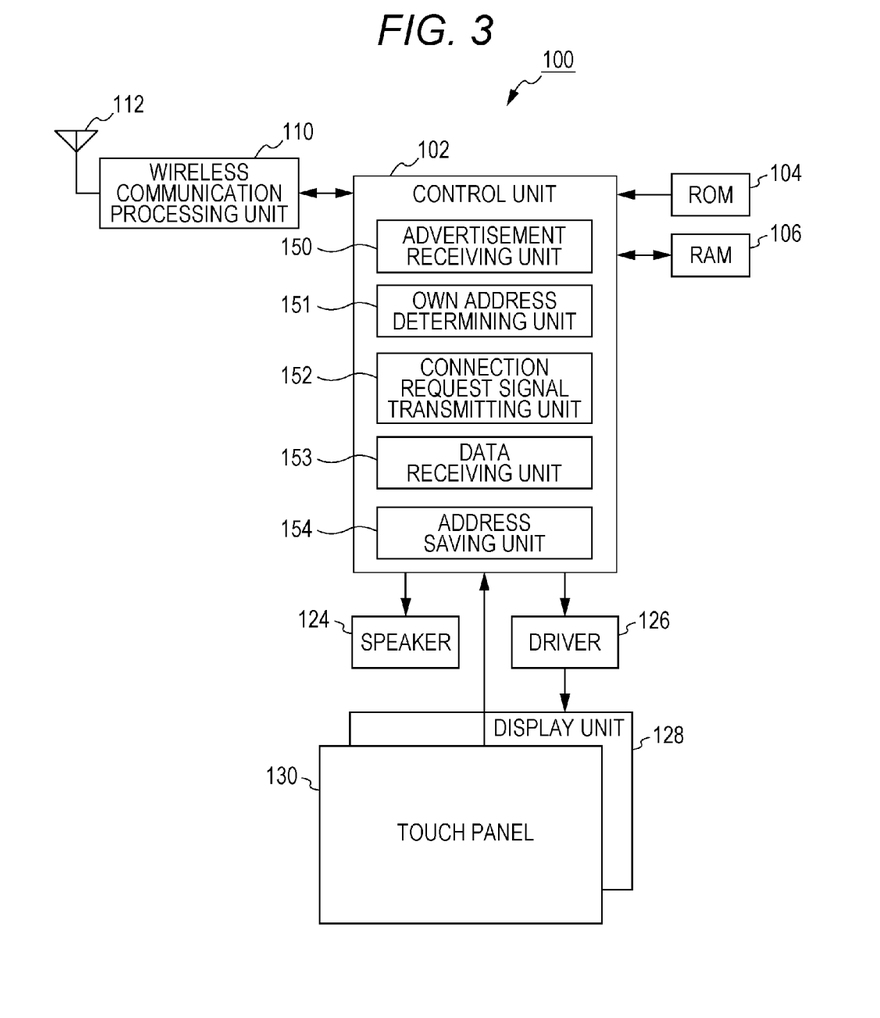
FIG. 3 is a block diagram illustrating an exemplary configuration of a central according to the embodiment.

Next, a configuration of the central 100 according to the embodiment will be described with reference to FIG. 3. FIG. 3 is a block diagram illustrating an exemplary configuration of the central 100. As illustrated in FIG. 3, the central 100 includes a control unit 102, a ROM 104, a RAM 106, a wireless communication processing unit 110, an antenna 112, a speaker 124, a driver 126, a display unit 128, and a touch panel 130.

Note that an address which is identification information of the central 100 is a random address which periodically, randomly changes in terms of confidentiality, etc. Hence, the central 100 does not have a fixed address.

The control unit 102 is composed of, for example, a CPU. The control unit 102 controls various types of functions provided to the central 100, by performing a software process according to a program (e.g., a program for implementing an advertisement reception process which will be described later) stored in the ROM 104.

The ROM 104 is composed of a nonvolatile memory such as a flash memory and stores, as described above, the program for controlling various types of functions by the control unit 102 and data. For the data, for example, data on an address history of the central 100 is stored. Note that the ROM 104 corresponds to a history storage unit.

The RAM 106 is composed of a volatile memory and used as a work area for temporarily storing data in order for the control unit 102 to perform various types of processes.

The wireless communication processing unit 110 is composed using, for example, a radio frequency circuit and a baseband circuit. The wireless communication processing unit 110 performs transmission and reception of radio signals based on BLE through the antenna 112.

The speaker 124 outputs audio such as an alarm, based on audio data from the control unit 102. The driver 126 outputs to the display unit 128 an image signal based on image data outputted from the control unit 102. The display unit 128 is composed of, for example, an LCD (Liquid Crystal Display) or an EL (Electroluminescence) display. The display unit 128 displays an image (e.g., the value of received measured data) according to the image signal outputted from the driver 126.

The touch panel 130 is an interface disposed on a top surface of the display unit 128 and used to input user's operation instructions. The touch panel 130 includes, for example, transparent electrodes which are not illustrated. When a user's finger or the like touches the touch panel 130, the touch panel 130 detects a position where a voltage change has occurred, as a touch position and outputs information on the touch position as an input instruction to the control unit 102.

Next, a functional configuration of the control unit 102 of the central 100 will be described. As illustrated in FIG. 3, the control unit 102 functions as an advertisement receiving unit 150, an own address determining unit 151, a connection request signal transmitting unit 152, a data receiving unit 153, and an address saving unit 154.

When there is a scan instruction by a user's operation or the like, the advertisement receiving unit 150 receives an advertisement. Specifically, after the scan instruction, the advertisement receiving unit 150 scans a channel in a frequency band over which a packet of an advertisement is transmitted, and thereby receives the advertisement.

Note that the user's operation for a scan instruction is considered to be, for example, activation of an application for using a measured-data provision service which is provided by the peripheral 200. Note also that a scan instruction is not limited to being performed by a user's operation and may be automatically performed after a lapse of a predetermined period of time from the activation of the application. The advertisement receiving unit 150 corresponds to a notice information receiving unit.

The own address determining unit 151 determines whether the advertisement received by the advertisement receiving unit 150 includes an address of the central 100. Note that a specific technique for this address determination will be described later. The own address determining unit 151 corresponds to a determining unit.

When it is determined that the advertisement includes an address of the central 100, the connection request signal transmitting unit 152 transmits to the peripheral 200 a connection request signal for making a connection request. Note that the connection request signal transmitting unit 152 corresponds to a connection request signal transmitting unit.

After establishing a connection with the peripheral 200 based on the transmission of the connection request signal, the data receiving unit 153 receives predetermined data (measured data in the embodiment) transmitted from the peripheral 200.

After receiving the predetermined data from the peripheral 200 with which the connection has been established, the address saving unit 154 saves the address of the central 100 in the ROM 104 before disconnecting the connection. The address saving unit 154 saves the address of the central 100 in the ROM 104 every time a connection is established with the peripheral 200. Hence, in the ROM 104 a history of the addresses of the central 100 which are randomly generated is saved.

As described above, the central 100 receives data after establishing a connection with the peripheral 200 by transmitting a connection request signal to the peripheral 200. The central 100 then saves its own address before disconnecting the connection with the peripheral 200. On the other hand, the peripheral 200 also obtains the address from the central 100 and saves the address. By this, both of the peripheral 200 and the central 100 which are paired by the establishment of the connection save the address of the central 100.

Figure 4:
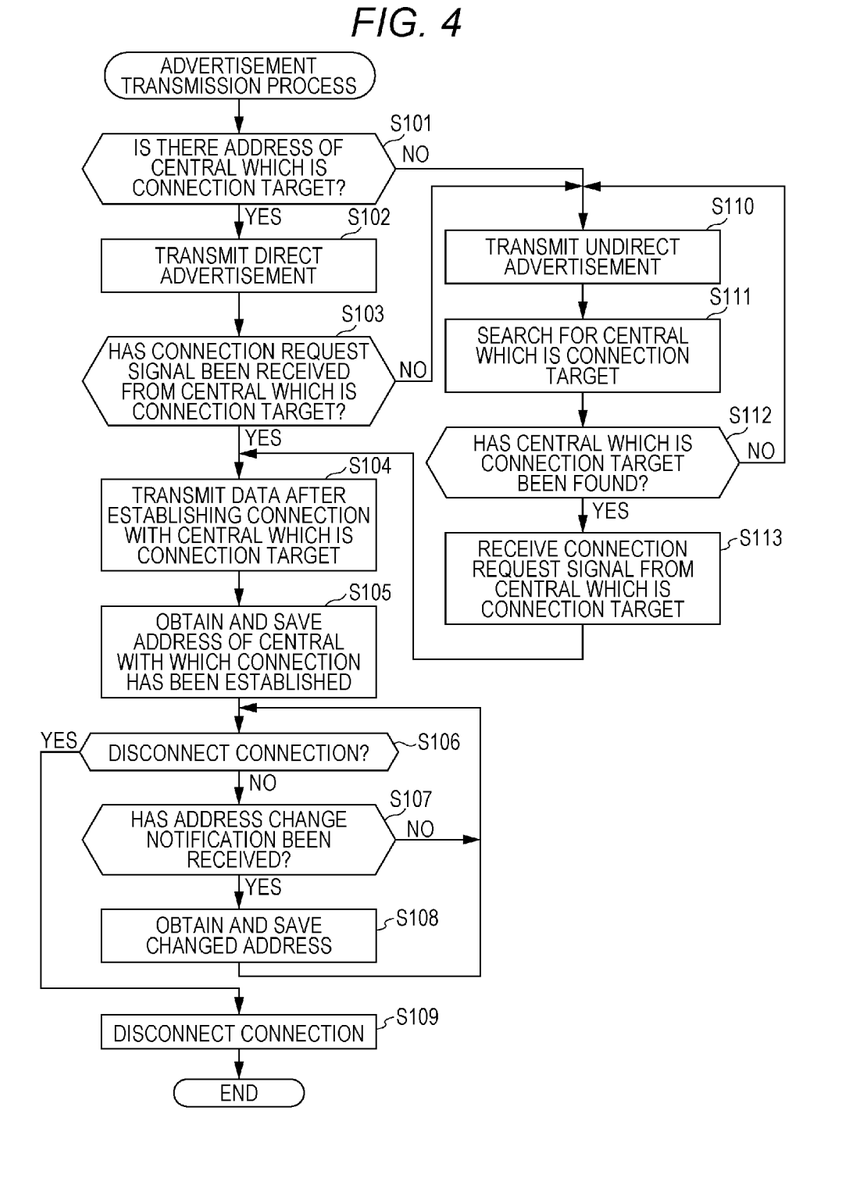
FIG. 4 is a diagram illustrating an example of a flowchart of an advertisement transmission process.

Next, an advertisement transmission process performed by the peripheral 200 will be described with reference to FIG. 4. The advertisement transmission process starts, triggered by the peripheral 200 determining a central 100 which is a connection target. The determining of the central 100 which is a connection target is made based on, for example, a user's operation performed on the operating unit 220 or the fact that a measured data transmission condition (e.g., the temperature is 25° C. or higher) which is preset by the central 100 is satisfied.

First, the address determining unit 250 of the peripheral 200 determines whether the ROM 204 has an address of the central 100 which is a connection target (step S101).

Here, if the ROM 204 has an address of the central 100 which is a connection target (step S101; Yes), i.e., if the peripheral 200 has established a connection in the past with the central 100 which is a connection target and thus has an address obtained upon the connection, the advertisement transmitting unit 251 transmits a direct advertisement (step S102). Specifically, the advertisement transmitting unit 251 broadcasts an advertisement including the address of the central 100. Note that, when the peripheral 200 has established a connection with the central 100 which is a connection target a plurality of times in the past, the advertisement transmitting unit 251 includes an address obtained upon the most recent connection in an advertisement.

Then, after transmitting the direct advertisement, the reception determining unit 252 determines whether a connection request signal from the central 100 which is a connection target has been received (step S103).

Here, if the central 100 which is a connection target is located within a wireless communicable range with the peripheral 200 and there is a scan instruction, the reception determining unit 252 of the peripheral 200 receives a connection request signal from the central 100 which is a connection target (step S103; Yes).

Then, after establishing a connection with the central 100 which is a connection target, the data transmitting unit 253 transmits data (step S104). Then, after the address obtaining unit 254 obtains an address from the central 100 with which the connection has been established, the address saving unit 255 saves the obtained address in the ROM 204 (step S105).

Note that the address is obtained by any technique. For example, the address can be obtained such that the address obtaining unit 254 of the peripheral 200 transmits an address transmission request signal to the central 100, and the central 100 transmits its own address to the peripheral 200 in response to the reception of the address transmission request signal.

Thereafter, it is determined whether to disconnect the connection with the central 100 (step S106). If it is determined not to disconnect the connection (step S106; No), the address obtaining unit 254 determines whether an address change notification has been received from the central 100 (step S107).

If an address change notification has not been received from the central 100 (step S107; No), processing returns to step S106. If an address change notification has been received from the central 100 (step S107; Yes), the address obtaining unit 254 obtains a changed address of the central 100 from the address change notification, and the address saving unit 255 saves the changed address in the ROM 204 (step S108). Thereafter, processing returns to step S106.

On the other hand, if it is determined to disconnect the connection with the central 100 (step S106; Yes), the control unit 202 of the peripheral 200 disconnects the connection (step S109) and the process ends.

On the other hand, if the ROM 204 does not have an address of the central 100 which is a connection target (step S101; No) and if a connection request signal cannot be received from the central 100 which is a connection target despite the transmission of the direct advertisement (step S103; No), the advertisement transmitting unit 251 transmits an undirect advertisement (step S110). Specifically, the advertisement transmitting unit 251 broadcasts an advertisement not including an address of the central 100.

The control unit 202 of the peripheral 200 then searches for the central 100 which is a connection target from among an unspecified number of centrals 100 (step S111).

For a technique for the search, a known technique is employed. For example, the central 100 which is a connection target is searched for such that, after transmitting the undirect advertisement, the control unit 202 compares a parameter that is transmitted from any one of the unspecified number of centrals 100 and that identifies the central 100 with a parameter of the central 100 which is a connection target prestored in the ROM 204, to determine whether the parameters match each other. Note that, for the storing of the parameter that identifies the central 100 which is a connection target, for example, the parameter is registered in the ROM 204 when the peripheral 200 is paired with the central 100.

Then, if the parameters do not match each other, the control unit 202 determines that the central 100 which is a connection target has not been able to be found (step S112; No) and thus performs a search again by transmitting an undirect advertisement (steps S110 and S111). The control unit 202 repeats the comparison between parameters by intermittently and repeatedly transmitting an undirect advertisement until finding the central 100 which is a connection target (steps S110 to S112).

If the parameters match each other, the control unit 202 determines that the central 100 which is a connection target has been found (step S112; Yes), and thus, transmits to the central 100 an advertisement including a notification indicating that the central 100 is a connection target, and receives a connection request signal from the central 100 (step S113). Thereafter, the control unit 202 performs the above-described processes at steps S104 to S109 with the central 100 and ends the advertisement transmission process.

Note that the above-described search by a known technique requires to individually perform wireless communication with an unspecified number of centrals 100, and thus, the time to receive a connection request signal by performing a search is generally longer than the time to receive a connection request signal by transmitting a direct advertisement.

Figure 5:
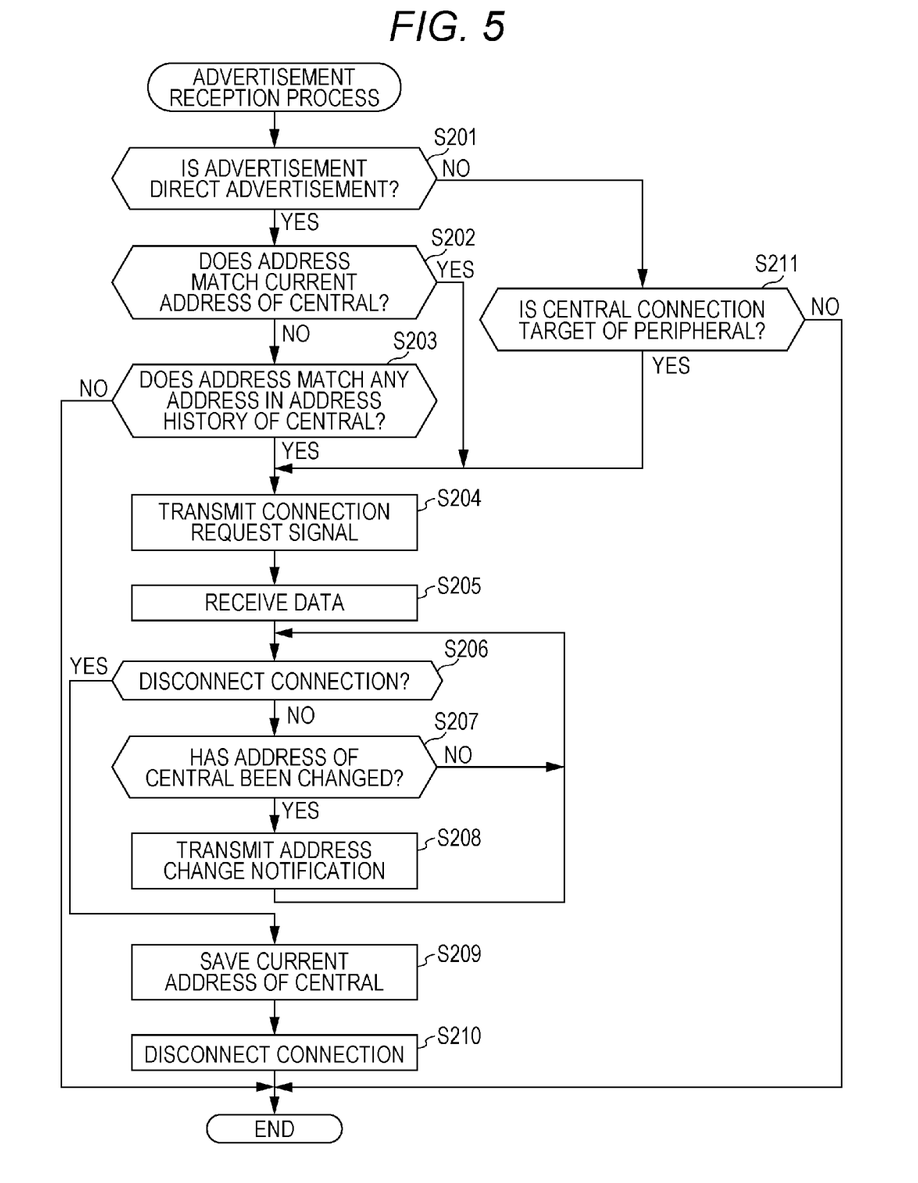
FIG. 5 is a diagram illustrating an example of a flowchart of an advertisement reception process.

Next, an advertisement reception process performed by the central 100 will be described with reference to FIG. 5. The advertisement reception process starts, triggered by the central 100 receiving an advertisement transmitted from the peripheral 200. Note that it is assumed that the central 100 is located within a wireless communicable range with the peripheral 200 and there is a scan instruction.

First, the advertisement receiving unit 150 determines whether the received advertisement is a direct advertisement (step S201). The advertisement receiving unit 150 can determine whether the advertisement is a direct advertisement by, for example, determining whether the advertisement includes an address.

Here, if the advertisement is a direct advertisement (step S201; Yes), the own address determining unit 151 determines whether the address included in the received advertisement matches a current address of the central 100 (step S202). The current address of the central 100 is, for example, the address of the central 100 available upon the reception of the advertisement.

Here, if the address included in the received advertisement matches a current address of the central 100 (step S202; Yes), the connection request signal transmitting unit 152 transmits a connection request signal to the peripheral 200 (step S204). The address of the central 100 is added to the connection request signal. Then, after establishing a connection with the peripheral 200, the data receiving unit 153 receives data transmitted from the peripheral 200 (step S205). Thereafter, it is determined whether to disconnect the connection with the peripheral 200 (step S206). If it is determined to disconnect the connection (step S206; Yes), processing proceeds to step S209. Then, the address saving unit 154 saves the current address of the central 100 before disconnecting the connection (step S209). Thereafter, the control unit 102 disconnects the connection (step S210) and ends the advertisement reception process.

On the other hand, if it is determined not to disconnect the connection with the peripheral 200 (step S206; No), it is determined whether the address of the central 100 has been changed (step S207). If the address of the central 100 has not been changed (step S207; No), processing returns to step S206. If the address of the central 100 has been changed (step S207; Yes), an address change notification including the changed address is transmitted to the peripheral 200 (step S208). Thereafter, processing returns to step S206. Note that the address change notification may be transmitted together with data to be transmitted or may be transmitted alone.

On the other hand, if the address included in the received advertisement does not match a current address of the central 100 (step S202; No), the own address determining unit 151 determines whether the address included in the received advertisement matches any address in the address history of the central 100 (step S203). Specifically, the own address determining unit 151 determines whether the received advertisement includes an address in the history by referring to the address history of the central 100 saved in the ROM 104.

Here, if the address matches any address in the address history of the central 100 (step S203; Yes), the above-described processes at steps S204 to S210 are performed and the advertisement reception process ends. On the other hand, if the address does not match any address in the address history of the central 100 (step S203; No), the central 100 is determined to be not a connection target of the peripheral 200 and thus the advertisement reception process ends.

On the other hand, if the advertisement is not a direct advertisement (step S201; No), i.e., if the advertisement is an undirect advertisement, the control unit 102 determines whether the central 100 is a connection target of the peripheral 200 (step S211). Specifically, after receiving the undirect advertisement, the control unit 102 transmits a parameter that identifies the central 100 to the peripheral 200. Then, if the control unit 102 receives from the peripheral 200 an advertisement including a notification indicating that the central 100 is a connection target, the control unit 102 determines that the central 100 is a connection target (step S211; Yes) and performs the processes at steps S204 to S210 and then ends the advertisement reception process.

On the other hand, if the control unit 102 has not received from the peripheral 200 an advertisement including a notification indicating that the central 100 is a connection target, the control unit 102 determines that the central 100 is not a connection target (step S211; No) and thus ends the advertisement reception process.

Figure 6:
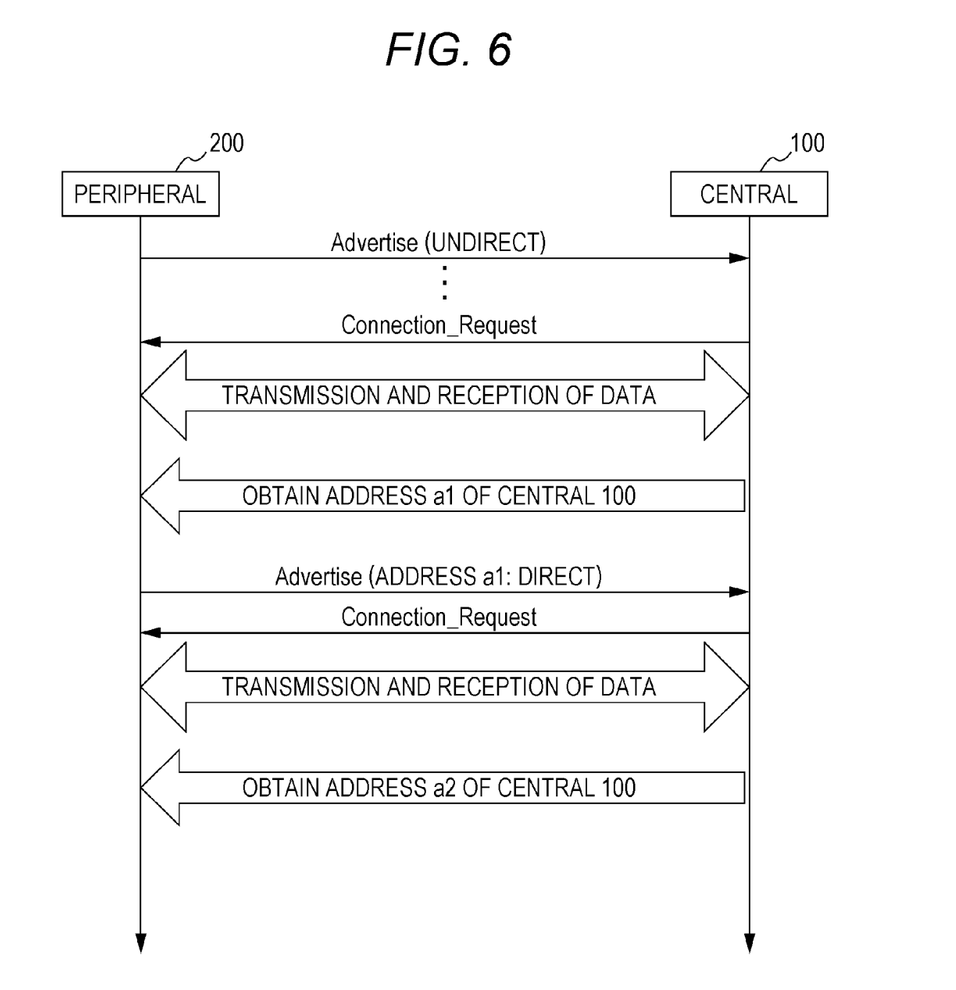
FIG. 6 is a diagram illustrating an example of a sequence according to the embodiment.

A specific example of the advertisement transmission and reception processes which are described above with reference to FIGS. 4 and 5 will be described with reference to FIG. 6. The diagram of FIG. 6 illustrating a sequence illustrates the transmission and reception of advertisements between the peripheral 200 and the central 100. It is assumed that the central 100 is located within a wireless communicable range with the peripheral 200 and there is a scan instruction. In addition, a scene is assumed where no connection has been established in the past between the peripheral 200 and the central 100 except paring therebetween.

First, since the peripheral 200 does not have an address of the central 100 which is a connection target, the peripheral 200 searches for the central 100 which is a connection target by intermittently transmitting an undirect advertisement. Then, when the peripheral 200 has found the central 100, the peripheral 200 receives a connection request signal from the central 100 and then establishes a connection. Then, after transmission and reception of data are performed between the peripheral 200 and the central 100, the peripheral 200 obtains an address a1 from the central 100.

Figure 7:
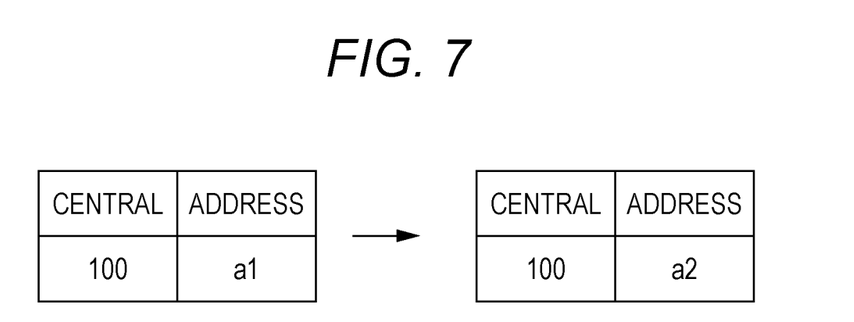
FIG. 7 is a diagram illustrating an example of an address of the central saved in the peripheral.

At this time, as illustrated on the left of FIG. 7, the peripheral 200 saves the obtained address a1 in the ROM 204 in association with the central 100. On the other hand, as illustrated on the left of FIG. 8, the central 100 saves its own address a1 as a history in the ROM 104.

Referring back to FIG. 6, when the peripheral 200 transmits an advertisement to the central 100 having been connected thereto once, the peripheral 200 transmits a direct advertisement including the obtained address a1. It is assumed that the address of the central 100 available upon the reception of the direct advertisement has been changed from a1 to a2.

In this case, the current address a2 of the central 100 does not match the address a1 of the central 100 included in the direct advertisement. Hence, the central 100 refers to the address history of the central 100 illustrated on the left of FIG. 8. Then, the central 100 determines that its own past address a1 matches the address a1 included in the direct advertisement, and thus, determines that the central 100 is a connection target of the peripheral 200.

Then, the central 100 transmits a connection request signal, and transmission and reception of data are performed between the peripheral 200 and the central 100. Then, the peripheral 200 obtains the address a2 from the central 100.

At this time, as illustrated on the right of FIG. 7, the peripheral 200 saves the address a2 in the ROM 204 by overwriting the address a1 with the obtained address a2. This is because, since the peripheral 200 transmits a direct advertisement including the latest address, the peripheral 200 does not use those addresses obtained upon connections established before the most recent connection. On the other hand, as illustrated on the right of FIG. 8, the central 100 saves its own address a2 as a history in the ROM 104.

Figure 8:
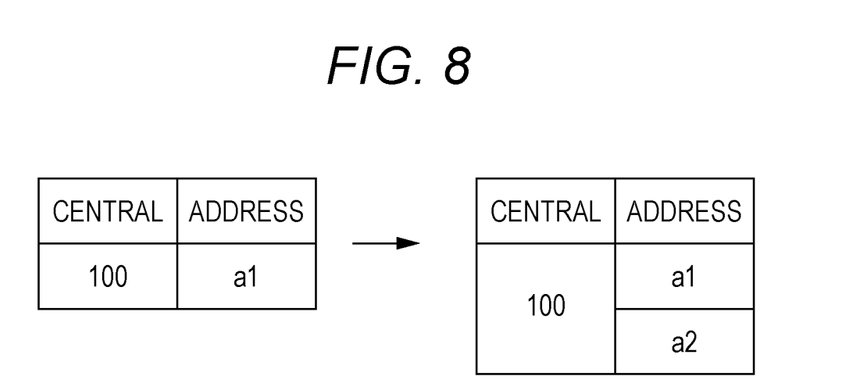
FIG. 8 is a diagram illustrating an example of an address history of the central saved in the central.

Note that, when the address of the central 100 available upon the reception of the direct advertisement is a1 with no change, the address history of the central 100 already has the address a1. In this case, the central 100 skips the process of overwriting the address a1 with a1 or saving the address a1.

Note that, when the embodiment is adapted to BLE, communication performed up to the transmission of a connection request by the central 100 and up to the reception of the connection request by the peripheral 200 is performed using a predetermined channel, and communication during processes after establishment of a connection up to disconnection is performed using a predetermined channel.

As described above, according to the embodiment, when the peripheral 200 has an address of the central 100 which is a connection target, the peripheral 200 transmits a direct advertisement including the address. Hence, when the address of the central 100 having received the direct advertisement remains the same as that available upon the most recent connection, the accuracy of a connection improves.

In addition, when the central 100 receives a direct advertisement and an address included in the direct advertisement does not match a current address, the central 100 determines, by referring to an address history of the central 100, whether the address matches any address in the history. Hence, even when the address of the central 100 has been changed, if a direct advertisement is one from the peripheral 200 having been connected to the central 100 in the past, then a connection can be established. Hence, since the number of connection failures upon transmission of a direct advertisement can be reduced, the accuracy of a connection can be improved while avoiding unnecessary communication between the peripheral 200 and the central 100.

Note that, although in the above-described embodiment when the peripheral 200 obtains an address from the central 100 the peripheral 200 overwrites an address saved therein with the obtained address, the configuration is not limited thereto. For example, if the ROM 204 has a large storage capacity, the peripheral 200 may save not only the latest address of the central 100 but also all addresses of the central 100. At this time, a direct advertisement including all addresses may be transmitted to the central 100 which is a connection target. By this, the accuracy of a connection to the central 100 can be further improved.

The description of the embodiment has been completed, but the embodiment is an example and thus the specific configurations and the content of the processes of the peripheral 200 and the central 100, etc., are, of course, not limited to those described in the embodiment.

(Variant)

Although in the above-described embodiment, for easy understanding, a description is made of an example of wireless communication between the central 100 and the peripheral 200 illustrated in FIG. 1, the configuration is not limited thereto. For example, the above-described advertisement transmission and reception processes can be applied to wireless communication for the case in which there are a plurality of centrals 100 and a plurality of peripherals 200.

Figure 9:
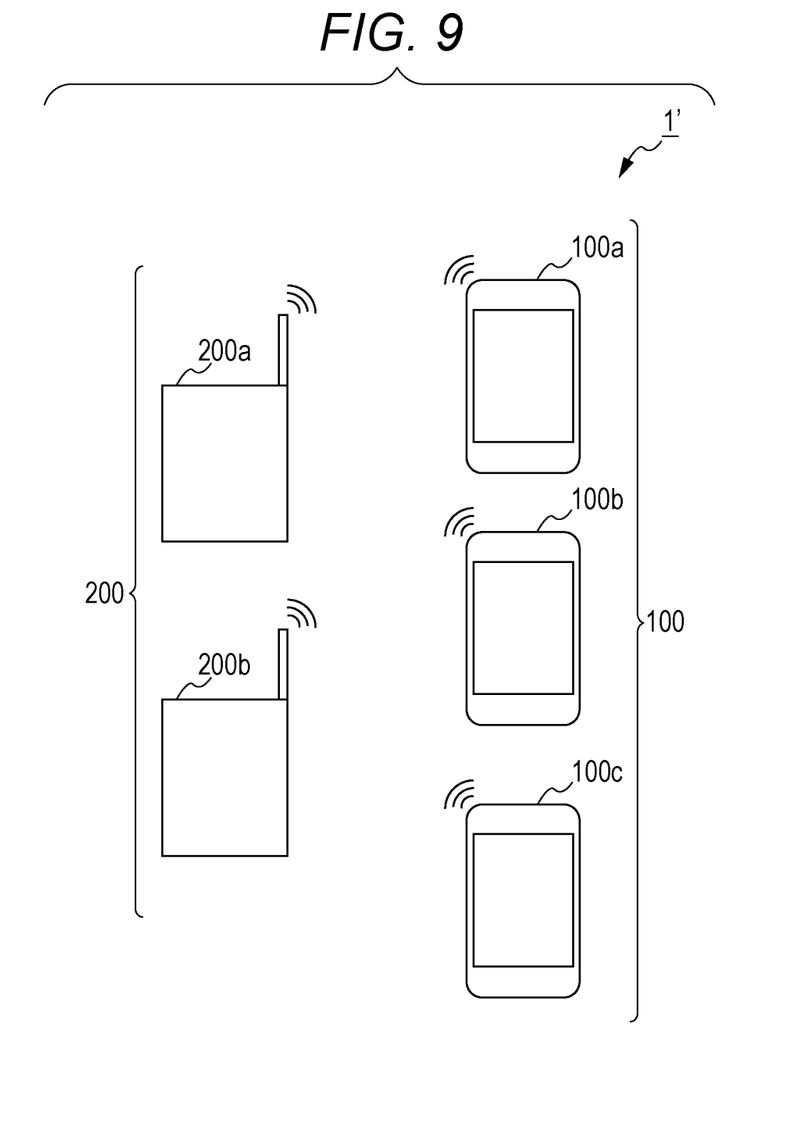
FIG. 9 is a diagram illustrating an exemplary configuration of a wireless communication system according to a variant.

FIG. 9 illustrates a wireless communication system 1' including peripherals 200a and 200b (also collectively called peripherals 200) and centrals 100a to 100c (also collectively called centrals 100). As a specific example, FIG. 10 illustrates the addresses of the centrals 100a to 100c stored in a ROM 204 of the peripheral 200a, and FIG. 11 illustrates an address history of the central 100a.

Figure 10:
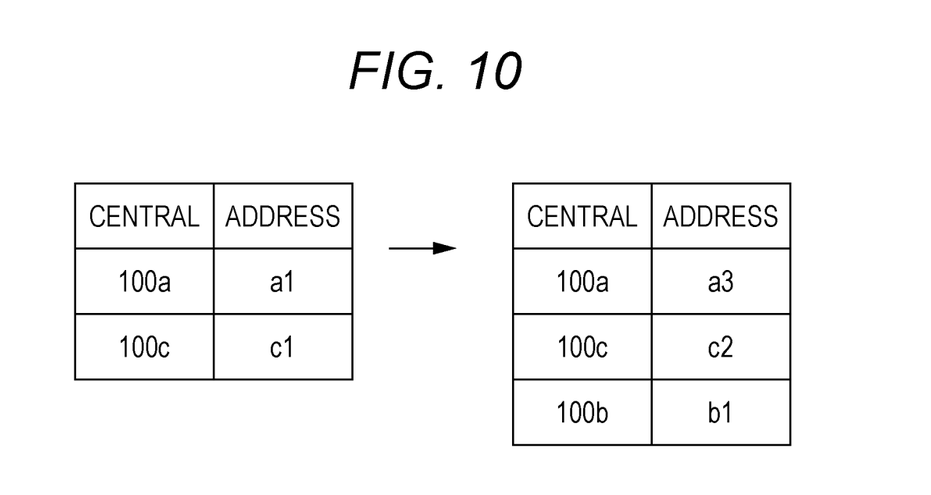
FIG. 10 is a diagram illustrating another example of the addresses of centrals saved in the peripheral.
Figure 11:
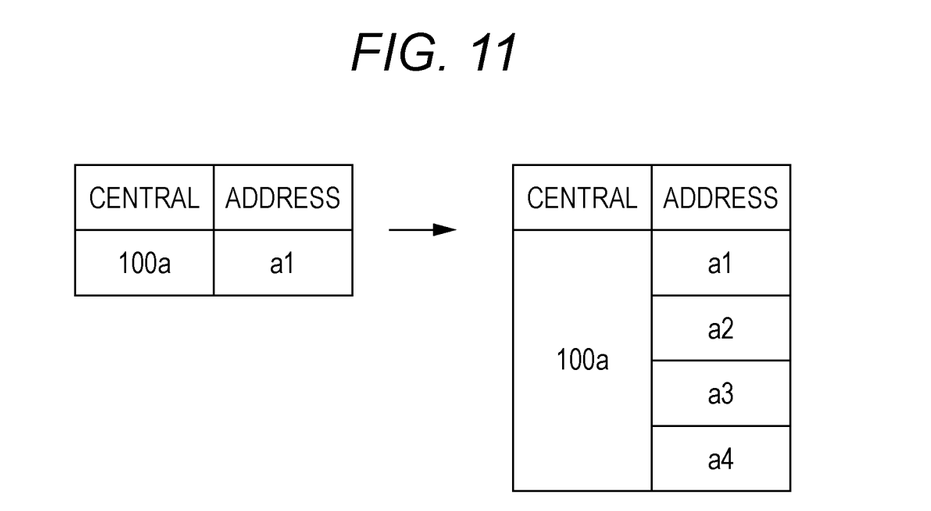
FIG. 11 is a diagram illustrating another example of an address history of a central saved in the central.

In an example illustrated on the left of FIG. 10, it can be seen that the peripheral 200a has performed an advertisement transmission process on the centrals 100a and 100c and thereby obtained addresses a1 and c1 and saved the addresses a1 and c1 in the ROM 204. Then, the peripheral 200a repeats an advertisement transmission process and thereby saves in the ROM 204 addresses a3, c2, and b1 obtained at the most recent connections, such as those shown in an example illustrated on the right of FIG. 10.

As such, every time the peripheral 200a establishes a connection with any of the centrals 100a to 100c by performing an advertisement transmission process, the peripheral 200a obtains an address and saves the address in the ROM 204.

Hence, when any of the centrals 100 serves as a next connection target, a peripheral 200 can transmit a direct advertisement including an address of the central 100, and thus, the accuracy of a connection improves.

On the other hand, every time the central 100a establishes a connection with the peripheral 200a or 200b, the central 100a saves its own address as a history in a ROM 104. In the example illustrated on the left of FIG. 11, it can be seen that the central 100a has saved its own address a1 as a history upon the first connection, and has saved its own address a4 as a history upon the most recent connection.

As such, even when a central 100 establishes a connection with a plurality of peripherals 200, every time the connection is established, the central 100 saves its own address as a history. By this, the accuracy of a connection improves.

For example, the case is considered in which the peripheral 200a has transmitted a direct advertisement including an address a3. In this case, even if the current address of the central 100a is a4 which is different than a3, since the history includes the address a3, the central 100a transmits a connection request signal to the peripheral 200a. Hence, the accuracy of a connection can be improved.

In addition, the central 100 and the peripheral 200 according to the present invention can be implemented using normal computer systems instead of dedicated apparatuses. For example, by computers executing programs, the functions of the central 100 and the functions of the peripheral 200 may be implemented. The programs for implementing the functions of the central 100 and the functions of the peripheral 200 may be stored in a non-transitory computer-readable recording medium such as a USB (Universal Serial Bus) memory, a CD-ROM (Compact Disc Read Only Memory), a DVD (Digital Video Disc), or an HDD (Hard Disk Drive) or may be downloaded to computers through a network.

Although a preferred embodiment of the present invention has been described above, the present invention is not limited to such a specific embodiment, and the present invention includes inventions recited in the claims and the range of equivalency of the claims.

What is claimed is:

1. A wireless communication apparatus comprising:
an antenna and circuitry configured to carry out wireless communication with another wireless communication apparatus;
a memory; and
a processor configured to:
obtain, from another wireless communication apparatus, identification information of the another wireless communication apparatus, the identification information having been changed after a connection;
store, in the memory, the identification information of the another wireless communication apparatus having been changed after the connection;
determine whether the memory has identification information of another wireless communication apparatus that is a connection target;
transmit notice information including the identification information of the another wireless communication apparatus that is the connection target when the memory has the identification information of the another wireless communication apparatus that is the connection target;
after transmitting the notice information, determine whether a connection request signal from the another wireless communication apparatus that is the connection target has been received; and
when the processor determines that the connection request signal has not been received, transmit notice information not including the identification information of the another wireless communication apparatus that is the connection target.

2. The wireless communication apparatus according to claim 1, wherein the processor transmits the notice information using a predetermined channel, and obtains the identification information of the another wireless communication apparatus having been changed after the connection, using a channel other than the predetermined channel.

3. A wireless communication apparatus comprising:
an antenna and circuitry configured to carry out wireless communication with another wireless communication apparatus;
a memory; and
a processor configured to:
obtain, from another wireless communication apparatus, identification information of the another wireless communication apparatus, the identification information having been changed after a connection;
store, in the memory, the identification information of the another wireless communication apparatus having been changed after the connection;
determine whether the memory has identification information of another wireless communication apparatus that is a connection target;
transmit notice information including the identification information of the another wireless communication apparatus that is the connection target when the memory has the identification information of the another wireless communication apparatus that is the connection target; and
when the processor determines that the memory does not have the identification information of the another wireless communication apparatus that is the connection target, transmit notice information not including the identification information of the another wireless communication apparatus that is the connection target.

4. A wireless communication method for a wireless communication apparatus, comprising:
- obtaining, from another wireless communication apparatus, identification information of the another wireless communication apparatus, the identification information having been changed after a connection;
- saving, in a memory, the identification information of the another wireless communication apparatus having been changed after the connection;
- determining whether the memory has identification information of another wireless communication apparatus that is a connection target;
- transmitting, when it is determined that the memory has the identification information of the another wireless communication apparatus that is the connection target, notice information including the identification information of the another wireless communication apparatus that is the connection target;
- after transmitting the notice information, determining whether a connection request signal from the another wireless communication apparatus that is the connection target has been received; and
- when it is determined that the connection request signal has not been received, transmitting notice information not including the identification information of the another wireless communication apparatus that is the connection target.

5. A non-transitory computer-readable medium having a program stored thereon that is executable by a computer of a wireless communication apparatus to cause the wireless communication apparatus to perform functions including:
- obtaining, from another wireless communication apparatus, identification information of the another wireless communication apparatus, the identification information having been changed after a connection;
- saving, in a memory, the identification information of the another wireless communication apparatus having been changed after the connection;
- determining whether the memory has identification information of another wireless communication apparatus that is a connection target;
- transmitting, when it is determined that the memory has the identification information of the another wireless communication apparatus that is the connection target, notice information including the identification information of the another wireless communication apparatus that is the connection target;
- after transmitting the notice information, determining whether a connection request signal from the another wireless communication apparatus that is the connection target has been received; and
- when it is determined that the connection request signal has not been received, transmitting notice information not including the identification information of the another wireless communication apparatus that is the connection target.

6. A peripheral that performs wireless communication based on Bluetooth (registered trademark) low energy with a central, the peripheral comprising:
- an antenna and circuitry configured to carry out wireless communication;
- a memory; and
- a processor configured to:
  - obtain identification information of the central from the central, the identification information having been changed after a connection;
  - store, in the memory, the identification information of the central having been changed after the connection;
  - determine whether the storage unit has identification information of a central that is a connection target,
  - when the processor determines that the memory has the identification information of the central that is the connection target, transmit an advertisement including the identification information of the central that is the connection target;
  - after transmitting the advertisement, determine whether a connection request signal from the central that is the connection target has been received; and
  - when the processor determines that the connection request signal has not been received, transmit an advertisement not including the identification information of the central that is the connection target.

7. The wireless communication apparatus according to claim 3, wherein the processor transmits the notice information using a predetermined channel, and obtains the identification information of the another wireless communication apparatus having been changed after the connection, using a channel other than the predetermined channel.

8. A wireless communication method for a wireless communication apparatus, comprising:
- obtaining, from another wireless communication apparatus, identification information of the another wireless communication apparatus, the identification information having been changed after a connection;
- saving, in a memory, the identification information of the another wireless communication apparatus having been changed after the connection;
- determining whether the memory has identification information of another wireless communication apparatus that is a connection target;
- transmitting, when it is determined that the memory has the identification information of the another wireless communication apparatus that is the connection target, notice information including the identification information of the another wireless communication apparatus that is the connection target; and
- when it is determined that the memory does not have the identification information of the another wireless communication apparatus that is the connection target, transmitting notice information not including the identification information of the another wireless communication apparatus that is the connection target.

9. A non-transitory computer-readable medium having a program stored thereon that is executable by a computer of a wireless communication apparatus to cause the wireless communication apparatus to perform functions including:
- obtaining, from another wireless communication apparatus, identification information of the another wireless communication apparatus, the identification information having been changed after a connection;
- saving, in a memory, the identification information of the another wireless communication apparatus having been changed after the connection;
- determining whether the memory has identification information of another wireless communication apparatus that is a connection target;
- transmitting, when it is determined that the memory has the identification information of the another wireless communication apparatus that is the connection target, notice information including the identification information of the another wireless communication apparatus that is the connection target; and when it is determined that the memory does not have the identification information of the another wireless communication apparatus that is the connection target, transmitting notice information not including the identification information of the another wireless communication apparatus that is the connection target.

10. A peripheral that performs wireless communication based on Bluetooth (registered trademark) low energy with a central, the peripheral comprising:
an antenna and circuitry configured to carry out wireless communication;
a memory; and
a processor configured to:
  obtain identification information of the central from the central, the identification information having been changed after a connection;
  store, in the memory, the identification information of the central having been changed after the connection;
  determine whether the storage unit has identification information of a central that is a connection target,
  when the processor determines that the memory has the identification information of the central that is the connection target, transmit an advertisement including the identification information of the central that is the connection target; and
  when the processor determines that the memory does not have the identification information of the central that is the connection target, transmit an advertisement not including the identification information of the central that is the connection target.

* * * * *